(12) United States Patent
Elhage et al.

(10) Patent No.: US 10,896,482 B2
(45) Date of Patent: Jan. 19, 2021

(54) SLICE SCAN IMAGING SYSTEM AND METHODS OF USE

(71) Applicant: LOCKHEED MARTIN CORPORATION, Bethesda, MD (US)

(72) Inventors: Alexander M. Elhage, Endicott, NY (US); Michael Riess, South Glens Falls, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 165 days.

(21) Appl. No.: 15/923,583

(22) Filed: Mar. 16, 2018

(65) Prior Publication Data

US 2018/0330472 A1    Nov. 15, 2018

Related U.S. Application Data

(60) Provisional application No. 62/504,683, filed on May 11, 2017.

(51) Int. Cl.

| G06T 3/40 | (2006.01) |
|---|---|
| G06T 7/33 | (2017.01) |
| G06T 5/20 | (2006.01) |
| G06T 5/00 | (2006.01) |
| G06T 5/50 | (2006.01) |
| H04N 1/191 | (2006.01) |
| H04N 1/387 | (2006.01) |

(52) U.S. Cl.
CPC .......... *G06T 3/4038* (2013.01); *G06T 5/002* (2013.01); *G06T 5/003* (2013.01); *G06T 5/20* (2013.01); *G06T 5/50* (2013.01); *G06T 7/33* (2017.01); *G06T 7/337* (2017.01); *H04N 1/1911* (2013.01); *H04N 1/387* (2013.01); *G06T 2207/20216* (2013.01); *G06T 2207/30176* (2013.01)

(58) Field of Classification Search
None
See application file for complete search history.

(56) References Cited

U.S. PATENT DOCUMENTS

| 8,600,194 | B2 | 12/2013 | Doepke | |
| 10,429,632 | B2* | 10/2019 | Abe | G02B 21/367 |
| 2009/0175539 | A1* | 7/2009 | Jahromi | G06K 9/00026 |
| | | | | 382/181 |
| 2018/0005392 | A1* | 1/2018 | Gao | G06T 7/337 |

* cited by examiner

*Primary Examiner* — Vikkram Bali
(74) *Attorney, Agent, or Firm* — Baker Botts L.L.P.

(57) ABSTRACT

The disclosure is directed to systems and methods for image capturing technologies and, more particularly, to a slice scan imaging system and respective processes to achieve high quality images. The method can be implemented in a computing device, which includes: capturing multiple lines of an image in a single slice; capturing multiple slices; stitching together the multiple slices by aligning common features of the images of a previous slice with a successive slice; and blending together the stitched together multiple slices.

19 Claims, 11 Drawing Sheets

SLICE SCAN IMAGING SYSTEM AND METHODS OF USE

FIELD OF THE INVENTION

The invention is directed to systems and methods for image capturing technologies and, more particularly, to a slice scan imaging system and respective processes to achieve high quality images.

BACKGROUND DESCRIPTION

Image capture systems for postal sorting and defect inspection on continuously moving conveyor belts require short exposure times and intense lighting. This is not always technically feasible with typical frame cameras, which capture a large image area simultaneously. Additionally, the object which is being captured may be jostling/rocking as it passes the camera, which requires a fast shutter speed to "stop the action".

Line scan cameras are typically used for these applications, but they have several shortcomings that limit advanced image processing options. Although the line scan cameras are commonly used for conveyor imaging systems for postal sorting and defect inspection, these cameras are able to utilize focused, intense lighting in order to capture objects at relatively high belt speeds. Also, the processing of such images is not able to account for the rocking motion of the object while it is being captured. This can result in a "shearing" distortion in the final image if the object is not firmly held in place.

A variation of the line scan camera, is the TDI (time delayed integration) line scan camera. The TDI camera is a scanning technology in which a frame transfer device produces a continuous video image for a moving object by means of a stack of linear arrays aligned with and synchronized to the motion of the object to be imaged. As the image moves from one line to the next, the integrated charge moves along with the image, providing higher pixel intensity at lower light levels than possible with line scan technologies. In this technology, the TDI camera is able to capture objects with shorter exposure times or less illumination, but they are subject to capturing "fuzzy" images if the object being captured is not firmly held from moving in any direction other than the direction of travel.

SUMMARY OF THE INVENTION

In an aspect of the invention, a method implemented in a computing device, comprises: capturing multiple lines of an image in a single slice; capturing multiple slices; (capitalizing on opportunities provided by overlapping areas); stitching together the multiple slices by aligning common features of the images of a previous slice with a successive slice; and blending together the stitched together multiple slices.

In yet another aspect of the invention, a computer program product comprises program code embodied in a computer-readable storage medium, the program code is readable/executable by a computing device to perform the method steps of any combination of features.

In still yet another aspect of the invention, a system comprises: a CPU, a computer readable memory and a computer readable storage medium; and program instructions to perform the method steps of any combination of features. The program instructions are stored on the computer readable storage medium.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to systems and methods for image capturing technologies and, more particularly, to a slice scan imaging system and respective processes to achieve high quality images. In a specific application, the slice scan imaging system can capture multiple slices of a mailpiece as it moves along a conveyer system and stitch such slices together to achieve high quality images. Accordingly, in one implementation the slice scan imaging system and processes described herein can be implemented in mail sorting and sequencing systems. Advantageously, in the systems and processes provided herein, it is now possible to capture images (e.g., address information on a mailpiece) without distortion, blur, etc., while also compensating for low light levels and noise issues, amongst other advantages, as it moves at high speed on a conveying system of a mail sorting and/or sequencing system.

In embodiments, a solution to poor image quality is provided by implementing a "slice scan" approach to capture narrow frames (e.g., multiple lines) of an object, e.g., mailpiece and in a particular embodiment, an address block of a mailpiece, as it moves past an image detector, e.g., "slice scan" camera or other imaging detectors (hereinafter referred to as "slice scan" camera). This approach allows highly focused illumination to be used, e.g., illumination on only a portion of the mailpiece, compared to intensely illuminating a large area of the mailpiece, which is needed in conventional systems. In addition, advanced image processing techniques that require the acquisition of multiple lines simultaneously can now be performed on the image slice captured from the "slice scan" camera. For example, in embodiments, each slice of the image can be aligned with a successive slice of the image in order correct for any rocking motion of the object between frames (slices), amongst other features described herein. This can be accomplished by detecting and matching features in the image which are common between successive slices (e.g., frames). These slices are then blended or stitched together to form a seamless image of high quality, which is representative of, e.g., the mailpiece. In embodiments, the "feature matching" for aligning successive slices is one approach that can be implemented in the aspects described herein. That is feature matching is one approach to the more general process of image registration for aligning images. As other examples, the alignment process can use image registration (feature matching) or intensity-based methods. Accordingly, the present invention does not strictly rely on using feature-based methods, and intensity-based methods may in fact be implemented herein.

SYSTEM ENVIRONMENT

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-readable program code embodied in computer-readable storage medium (non-transitory medium). The computer-readable storage medium can contain or store information for use by or in connection with the instruction execution system, apparatus, or device. The computer-readable storage medium may be, for example, an electronic, magnetic, optical, electromagnetic, infrared, or semiconductor system, apparatus, or device or other non-transitory medium, memory, device or system.

More specific examples of the computer-readable storage medium would include the following non-transitory systems, devices and/or memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium, memory, system and/or device is not to be construed as being transitory signals per se. Hereinafter, the computer readable storage medium, memory, system and/or device is generally referred to as computer readable storage medium.

Figure 1:
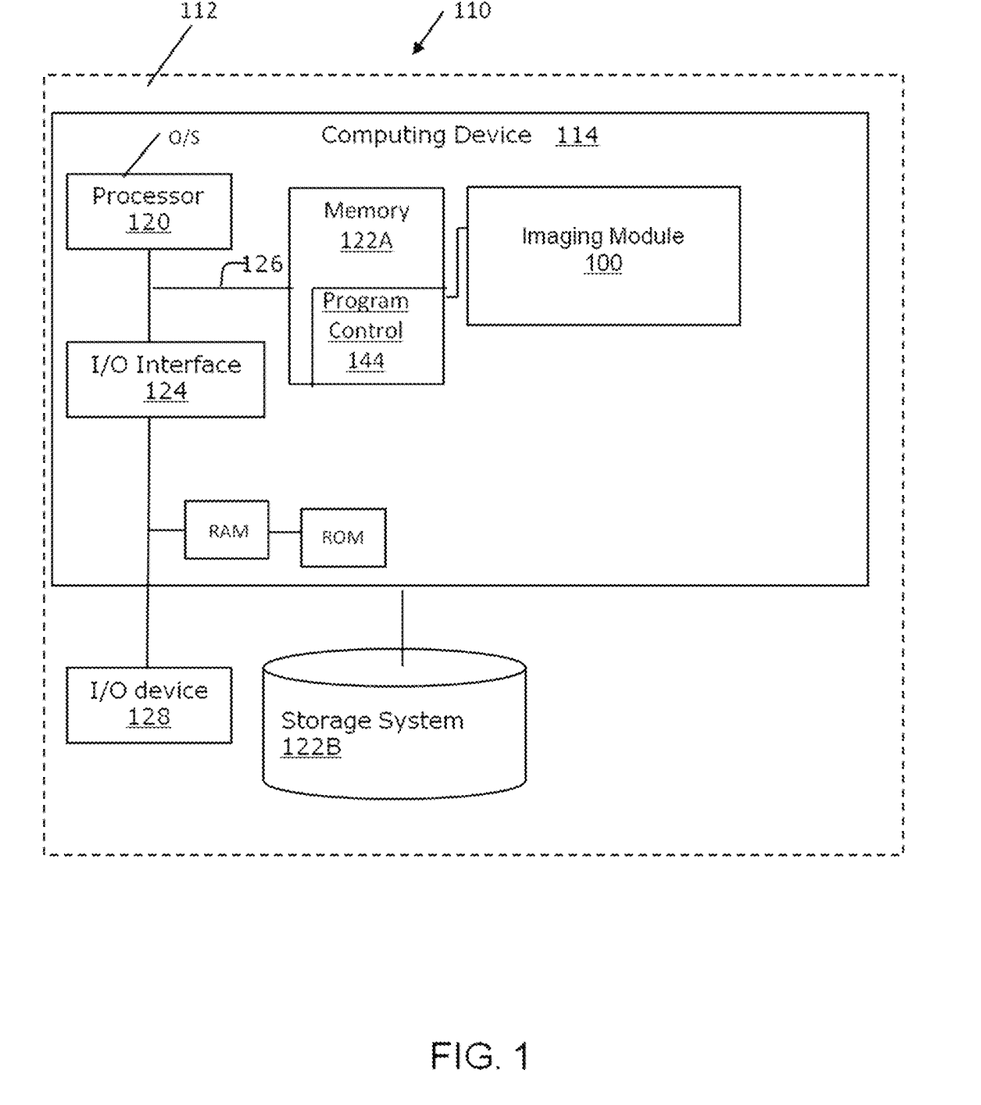
FIG. 1 shows an illustrative environment for implementing the steps in accordance with aspects of the invention.

FIG. 1 shows an illustrative environment 110 for managing the processes in accordance with the invention. The environment 110 includes a server or other computing system 112 that can perform the processes described herein. In embodiments, the illustrative environment may be used in a mail sorting and sequencing system as shown illustratively in FIG. 8; although other sorting and sequencing systems are also contemplated by the present invention. The computing system 112 includes a computing device 114 which can be resident on or communicate with a network infrastructure or other computing devices.

The computing device 114 includes a processor 120, memory 122A, an I/O interface 124, and a bus 126. In addition, the computing device 114 includes random access memory (RAM), a read-only memory (ROM), and an operating system (O/S). The computing device 114 is in communication with an external I/O device/resource 128 and the storage system 122B. The I/O device 128 can comprise any device that enables interaction with the computing device 114 (e.g., user interface) or any device that enables the computing device 114 to communicate with one or more other computing devices using any type of communications link or any device that enables the computing device 114 to interact with its environment. By way of example, the I/O device 128 can be a "slice scan" camera which simultaneously captures multiple lines of an image in a single slice and captures multiple slices of the image representative of an object, e.g., mailpiece, as the object is traveling through a mail sorting and/or sequencing system shown in FIG. 8 as an example.

The processor 120 executes computer program code (e.g., program control 144), which can be stored in the memory 122A and/or storage system 122B. While executing the computer program code, the processor 120 can read and/or write data to/from memory 122A, storage system 122B, and/or I/O interface 124. The program code 144 executes the processes of the invention such as, for example, stitching together multiple slices (each of which is composed of multiple lines) of an image, e.g., as the object travels through a sorting and/or sequencing system at high speeds, amongst other features described herein.

The computing device 114 includes a imaging module 100, which can be implemented as one or more program code in the program control 144 stored in memory 122A as a separate or combined module. Additionally, the imaging module 100 may be implemented as separate dedicated processors or a single or several processors to provide the functionality of this tool. Moreover, it should be understood by those of ordinary skill in the art that the imaging module 100 is used as a general descriptive term for providing the features and/or functions of the present invention, and that the imaging module 100 may comprise many different components such as, for example, the components and/or infrastructure described and shown with reference to FIG. 1.

In embodiments, the imaging module 100 is operative and/or configured to, e.g., (i) provide higher quality images of a mailpiece (compared to conventional line scan processes), (ii) amplify low light conditions, (iii) reduce noise, (iv) improve depth of field, (v) compensate or correct for blurry imaging, and (v) reduce glare, amongst other features. In addition, by implementing such slice scan techniques through the imaging module 100 as described herein, it is now possible to use color "scan line" cameras to capture the images. In further embodiments, by implementing the systems and processes herein any light source greater than ambient light of the surrounding area can be used when capturing the image. That is, by implementing the systems and processes described herein, special lighting technologies used in high speed applications could be eliminated.

As a first example, the imaging module 100 can stitch together multiple slices of an image of a mailpiece or text of a mailpiece or other object in order to correct for any rocking motion of the object between frames (e.g., slices). This is generally accomplished by: (i) obtaining multiple image slices of an object (e.g., mailpiece) from a "slice scan" camera, where many lines are captured simultaneously in each single slice; and (ii) stitching together the multiple slices to form a single image of the object by matching features (image registration) or intensity-based methods in each image slice common between successive slices (e.g., frames). This results in a high speed imaging system, which can capture objects not firmly held in place without intensely illuminating a large area.

In embodiments, the "slice scan" camera will capture narrow slices of an object, e.g., simultaneously capture two or more lines. In more preferred embodiments, the narrow slices will be less than an entire image, e.g., mailpiece. In even more specific embodiments, the "slice scan" camera can simultaneously capture about 32 lines of image and, in even more specific embodiments, "N" number of lines which is approximately equal to the thickness of a focused light source, e.g., fluorescent or LED light source, which illuminates a portion of the object.

Figure 3:
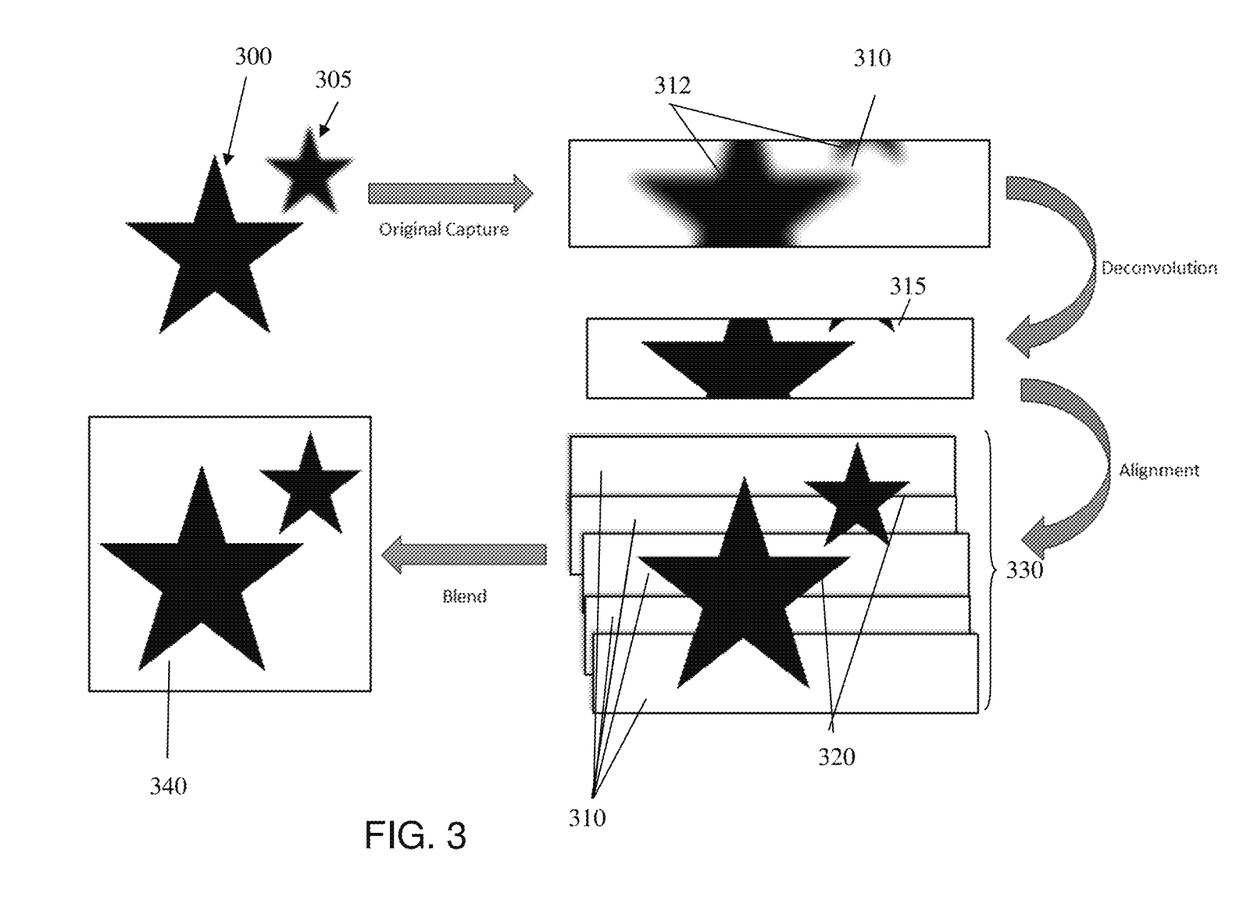
FIG. 3 shows a technique for increasing the depth of field of an image in accordance with aspects of the present invention.

In addition, by implementing the processes described herein, it is possible to use other advanced techniques to improve the value of the imaging system. For example, wavefront coding can be implemented, which is a technique that will increase the depth of field in an image as shown in FIG. 3. More specifically, in optical applications, wavefront coding refers to the use of a cubic phase modulating element in conjunction with deconvolution to extend the depth of field of a digital imaging system such as the "slice scan" camera. In this technique, a number of lines are captured simultaneously through a lens which blurs the image uniformly. A deconvolution is then performed which brings a large range back into focus (e.g., see FIG. 3). A typical kernel size for this operation is 11×11, meaning at least 11 lines of data should be captured at a time. (This technique is not possible with line scan cameras currently in use.)

Figure 4:
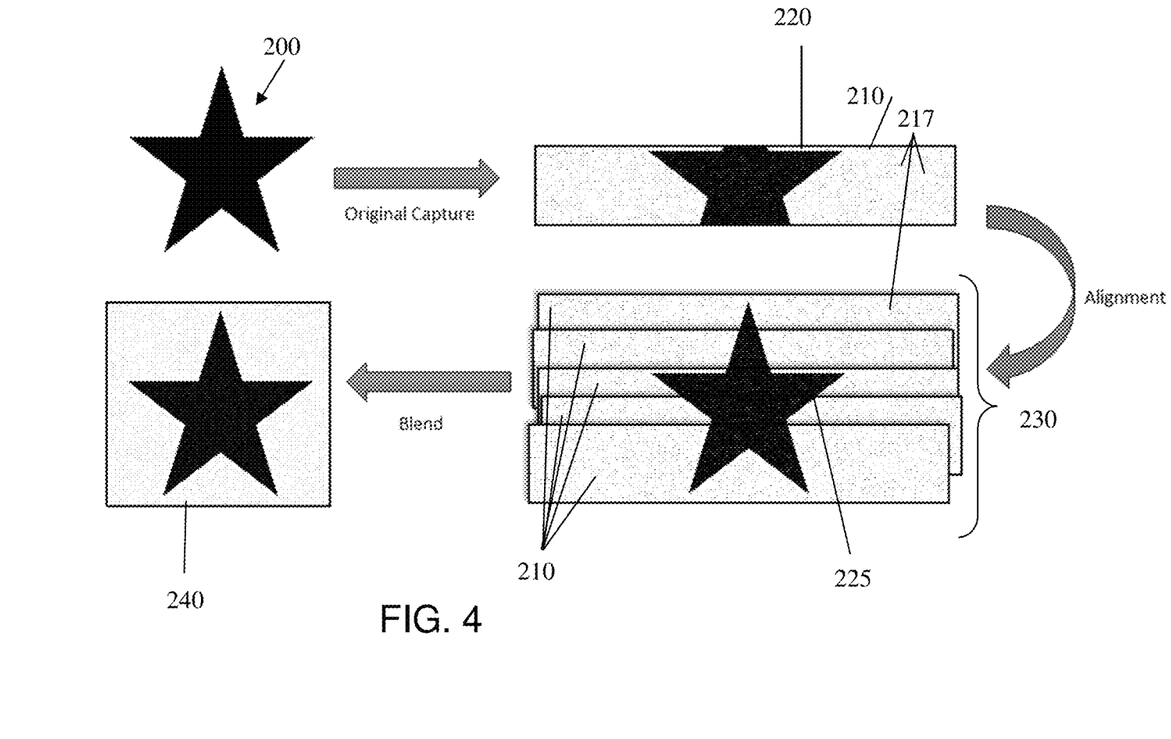
FIG. 4 shows a technique for reducing noise in the image in accordance with aspects of the invention.
Figure 5A:
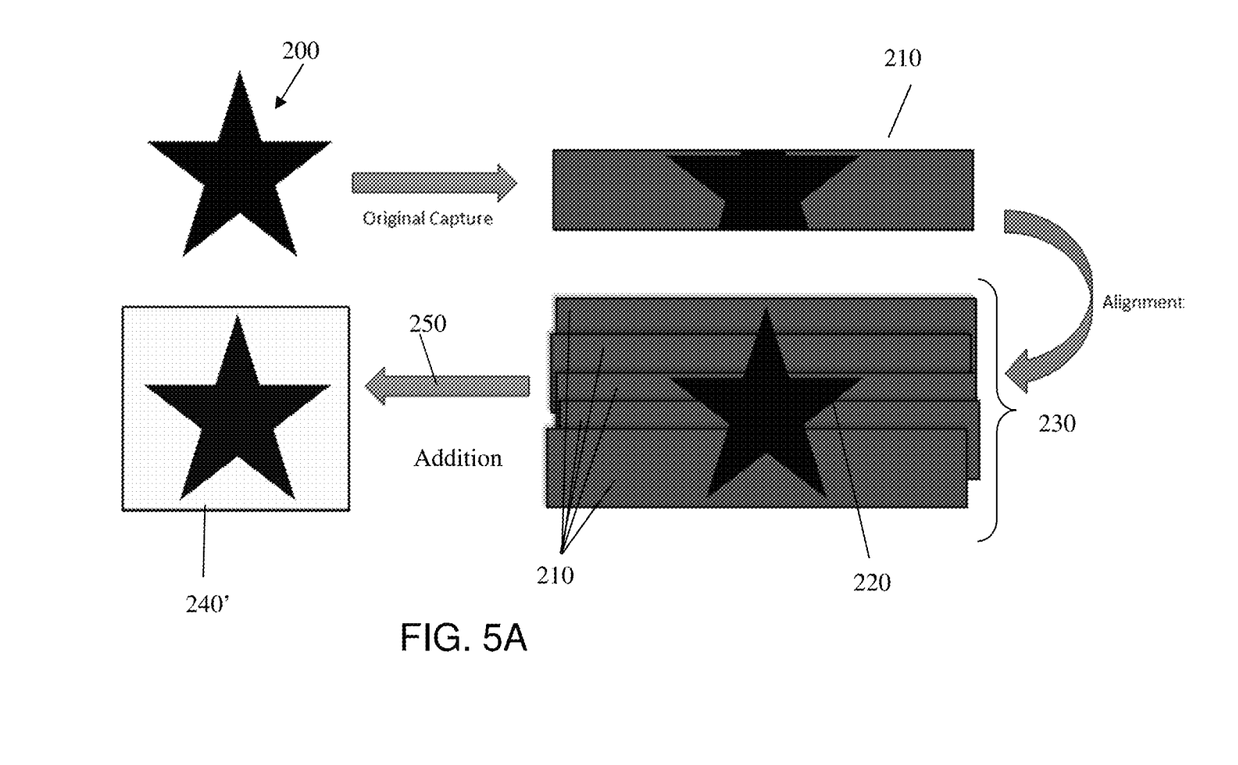
FIGS. 5A and 5B show a technique for combining individual slices in order to amplify the intensity of light captured by the image sensor in accordance with aspects of the invention.
Figure 5B:
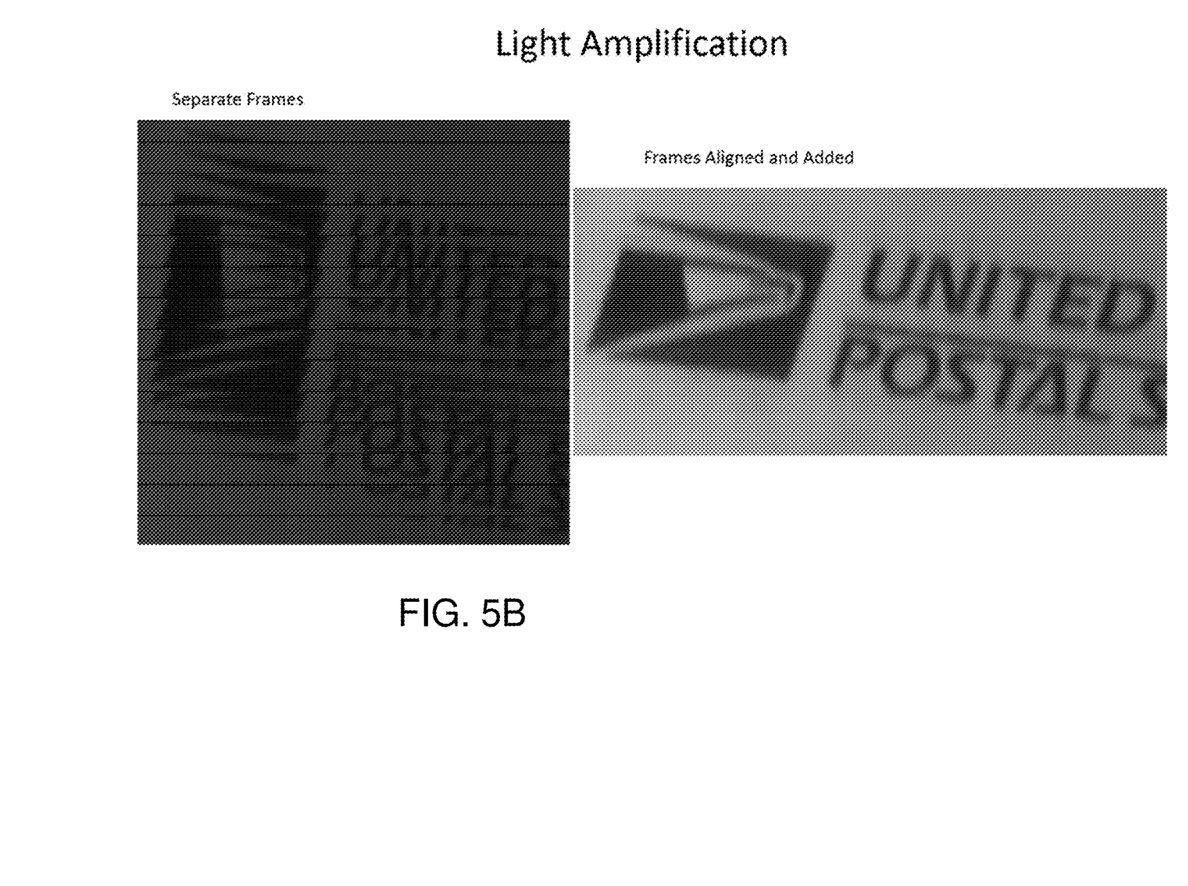

In additional implementations, the systems and processes described herein enable noise reduction as shown in FIG. 4. For example, because subsequent slices will contain overlapping data, the slices can be combined in a way which reduces the effects of noise on the final image as shown in FIG. 4. In addition, individual slices can also be combined in order to amplify the intensity of light captured by the image sensor (slice scan" camera) as shown in FIGS. 5A and 5B. This will behave similar to a TDI camera in that shorter exposure times (which enables faster object transport) or less illumination can be used; however, because alignment can be performed on the slices, a high quality image can be produced even if the object is rocking. In addition, with the "slice scan" imaging system and processes as described herein, the noise reduction effects previously discussed may reduce noise to an acceptable level while correcting for the motion blur, as demonstrated in FIGS. 6A and 6B.

Figure 7A:
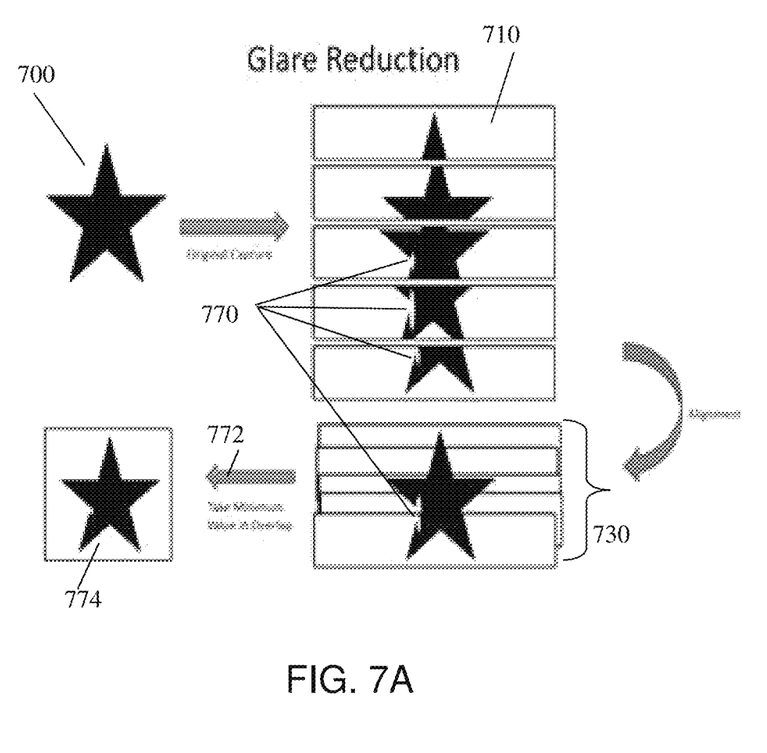
FIGS. 7A and 7B representatively show a technique for glare reduction in accordance with aspects of the invention.
Figure 7B:
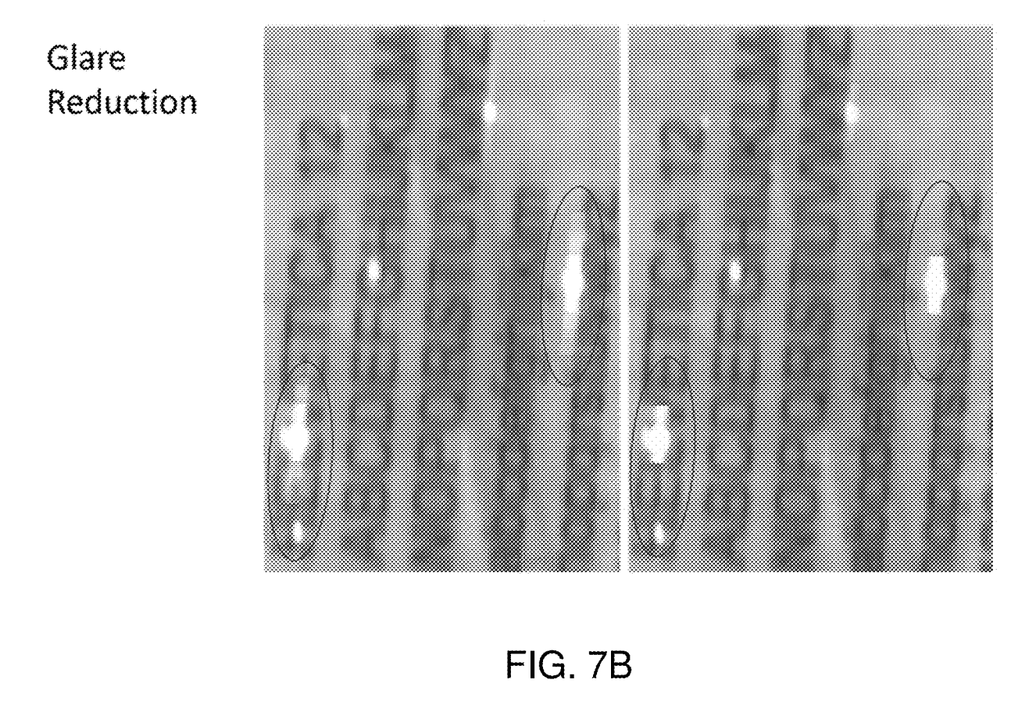

It should also be understood by those of skill in the art that capturing many overlapping slices also enables a technique for significantly reducing glare as shown in FIGS. 7A and 7B. For example, during the blending process as implemented by the processes described herein, regions of the image which contain glare can be detected and ignored. This will result in a blended final image which contains significantly less glare.

IMPLEMENTATIONS

FIGS. 2-7 show representations of different techniques (processes) implemented by the systems and processes described herein. These figures can also represent exemplary flows for respective processing steps in accordance with aspects of the present invention. The exemplary representations can be implemented as a system, a method, and/or a computer program product and related functionality implemented on the computing system of FIG. 1. Accordingly, the processes associated with each representative figure can be implemented by special purpose hardware-based systems that perform the specified functions or acts or carry out combinations of special purpose hardware and computer instructions. It is also contemplated that any combination of techniques described herein can be used together in parallel or serially.

Stitching Together Slices to Form an Image

Figure 2:
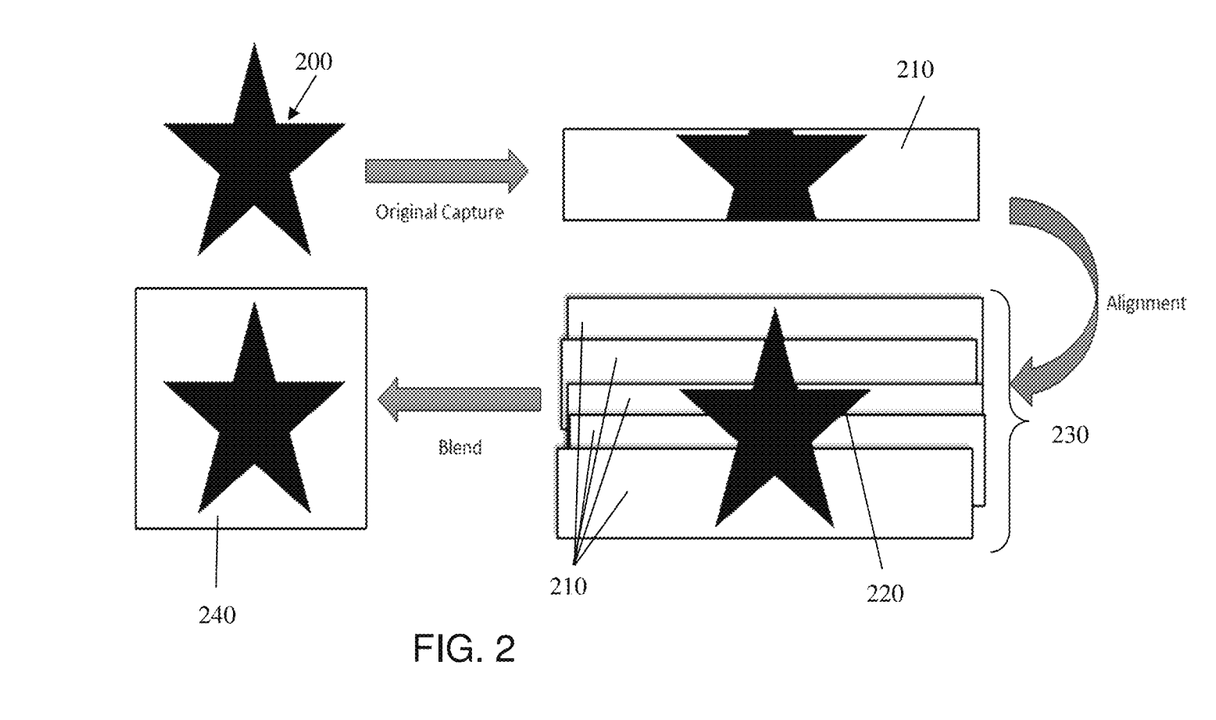
FIG. 2 shows a representation of stitching together several slices of an image in accordance with aspects of the present invention.

FIG. 2 shows a representation of stitching together several slices of an image in accordance with aspects of the present invention. More specifically, as representatively shown at reference numeral 210, a slice of an object 200, e.g. star, is captured by a "slice scan" camera. As should be understood by those of ordinary skill in the art, each successive frame (e.g., slice) (each of which are represented by reference numerals 210) may have common overlapping subject with a previous frame (slice).

As in all aspects of the invention, the "slice scan" camera is used to capture very narrow frames (slices comprising multiple lines) as the object moves past the camera. In each of the embodiments, the "slice scan" camera will simultaneously capture multiple lines of the object in a single slice and capture multiple slices, which have overlapping subject matter such as, e.g., a point on the star 220. In this representation, the slice 210 can be about 32 lines, although "N" number of lines for each slice is contemplated by the present invention. For example, the number of lines may be equal to or approximately equal to the area (e.g., thickness) of a highly focused illumination on a certain area of the object, rather than intensely illuminating a large area needed in conventional camera technologies.

As shown at reference numeral 230, each of the slices are then stitched together (e.g., shingled together) to form a single mosaic image of the object. In stitching together the slices, each slice is aligned with the successive image in order correct for any rocking motion of the object in between frames (slices). This is shown representatively by detecting and matching features (image registration) or intensity-based methods in the image which are common between adjacent (successive) slices, e.g., the point of the star 220, and overlapping such slices to form a mosaic image of the object. In embodiments, the overlapping can be one (1) or more lines of the slices. The alignment of the slices is shown by the shift or offset nature of each slice (to the left and right). These frames (slices) are then blended together to form a seamless image as shown at reference numeral 240.

In alternate embodiments, the processes described herein can also provide an edge to edge mosaic, instead of an overlapping or shingling of the slices. It should be understood that the overlapping (e.g., shingling) of the slices will typically provide a more robust alignment, though. In this embodiment, the alignment will be provided by stitching together the slices at their edges. For example, in this embodiment, the imaging module may detect transitioning features (different shades or colors of the image at the edges of the slice) that can be aligned together between the different slices, as an example.

Increasing Depth of Field of an Image

FIG. 3 representatively shows a technique for increasing the depth of field of an image. As shown in FIG. 3, two objects 300 and 305, e.g., stars, are shown at different focal lengths. Specifically, star 305 is blurry; whereas, star 300 is in focus. In this technique, once again, multiple slices of the objects, e.g. stars, are captured by a "slice scan" camera, as the objects move past the camera. And, as previously described, the "slice scan" camera will capture multiple slices of the objects, which have overlapping subject matter such as, e.g., a point on the star 320. As should be understood by those of ordinary skill in the art, each successive frame (e.g., slice) 310 may have common overlapping subject with a previous frame (slice).

A typical kernel size for this operation is 11×11, meaning at least 11 lines of data should be captured at a time, although "N" number of lines for each slice is contemplated by the present invention. Additionally, the 11×11 size is an example based on a particular wavefront coding/deconvolution being implemented, and is not necessarily fixed in size other than, perhaps, in embodiments, 3×3 or greater.

In embodiments, the "slice scan" camera includes a filter which blurs the image uniformly, as shown by reference numeral 312. As shown at reference numeral 315, each of the slices will be deconvoluted to bring a large range of the images back into focus. This can be accomplished using a wavefront coding technique. The separate slices are then stitched together to form a single mosaic image representing the objects as shown at reference numeral 330. In this implementation, each slice is aligned with the successive image in order correct for any rocking motion of the object in between frames (slices) as already described herein, e.g., by detecting and matching features (image registration) or intensity-based methods in the image which are common between successive slices, e.g., the point of the star 320. These frames (slices) are then blended together to form a seamless image as shown at reference numeral 340.

Reducing Noise in the Image

FIG. 4 shows a technique for reducing noise in the image in accordance with aspects of the invention. In this noise reduction technique, overlapping of the scan lines can be used to correct for motion.

In this implementation, as previously described, multiple slices 210 of the object 200 (e.g., star) are captured as the object moves past the camera. The noise 217 is represented as speckles or dots within each of the slides 210. In this technique, prior to or after stitching together each of the slices to form a single mosaic image representative of the object, the values of the matched features in the image which are common between successive slices, e.g., the point of the star 220, can be averaged together to reduce any noise from any single slice, as shown by reference numeral 225. In this way, it is possible to compensate for any overlapping data that may be slightly different (blurry, etc.) due to movement of the object, e.g., rocking. If there is no noise, then all overlapping images would be the same and, hence, no need for the averaging techniques applied herein. These frames (slices) are then blended together to form a seamless image as shown at reference numeral 240.

Amplification of Low Light Conditions

As shown representatively in FIGS. 5A and 5B, individual slices can be combined in order to amplify the intensity of light captured by the image sensor, e.g., "slice scan" camera. For example, in this representation, a slice 210 of an object 200, e.g. star, captured by the "slice scan" camera may be of varying dimness (brightness) due to the light intensity provided on the object 200. For example, pixel intensity of the image or portions of the image on each slice captured by the "slice scan" camera may vary from 0-255 for an 8 bit value (although other values, e.g., 12 bit values, are also contemplated herein), where 0 is dark and 255 is the brightest. In this example, any value of over 255 will result in an oversaturated image.

As shown at reference numeral 230, each of the slices are aligned and stitched together to form a single mosaic image of the object. In stitching together the slices, each slice is aligned with the successive image in order correct for any rocking motion of the object in between frames (slices). This is shown representatively by detecting and matching features (image registration) or intensity-based methods in the image which are common between adjacent (successive) slices, e.g., the point of the star 220, and overlapping such slices to form a mosaic image of the object. The alignment of the slices is shown by the shift or offset nature of each slice (to the left and right).

In embodiments, the pixel intensity values associated with the overlapped images can be added together as shown representatively at reference numeral 250. By adding together the pixel intensity values of the common features of the overlapped slices, the light intensity can be increased, resulting in a brighter image as shown at reference numeral 240'.

In embodiments, the processes described herein will not over saturate the image; that is, the addition process will not exceed a maximum value, e.g., 255 for an 8 bit value. In embodiments, the values could be add up to more than 255, but later normalized to create an image with values between 0 and 255. In this way, it is now possible to use a less intense light source and/or move the objects at a faster rate using a same shutter speed as a slower rate. And, advantageously, the less intense light source can now be any light source, e.g., fluorescent, that will illuminate the object above the ambient light source. This also facilitates the use of color cameras in such industrial applications.

Correcting for Motion Blur

In further implementations, the systems and processes described herein allow for the use of less illumination or higher transport speeds by correcting for motion blur. When illumination is decreased (and therefore exposure time increased) or higher transport speeds are used, for example, motion blur may occur. Because the imaging system (e.g., "slice scan" camera) is used in a controlled environment in which the speed of the objects being captured are known fairly accurately, a Wiener deconvolution technique can be used to correct this blur to an extent.

As should be understood by those of skill in the art, Wiener deconvolution is an application of the Wiener filter to noise problems inherent in deconvolution. It works in the frequency domain, attempting to minimize the impact of deconvolved noise at frequencies which have a poor signal-to-noise ratio. The Wiener deconvolution method has widespread use in image deconvolution applications, as the frequency spectrum of most visual images is fairly well behaved and may be estimated easily. Although the Wiener deconvolution can be used in line scan imaging systems, this technique significantly amplifies noise, which may make the final image unusable.

Figure 6A:
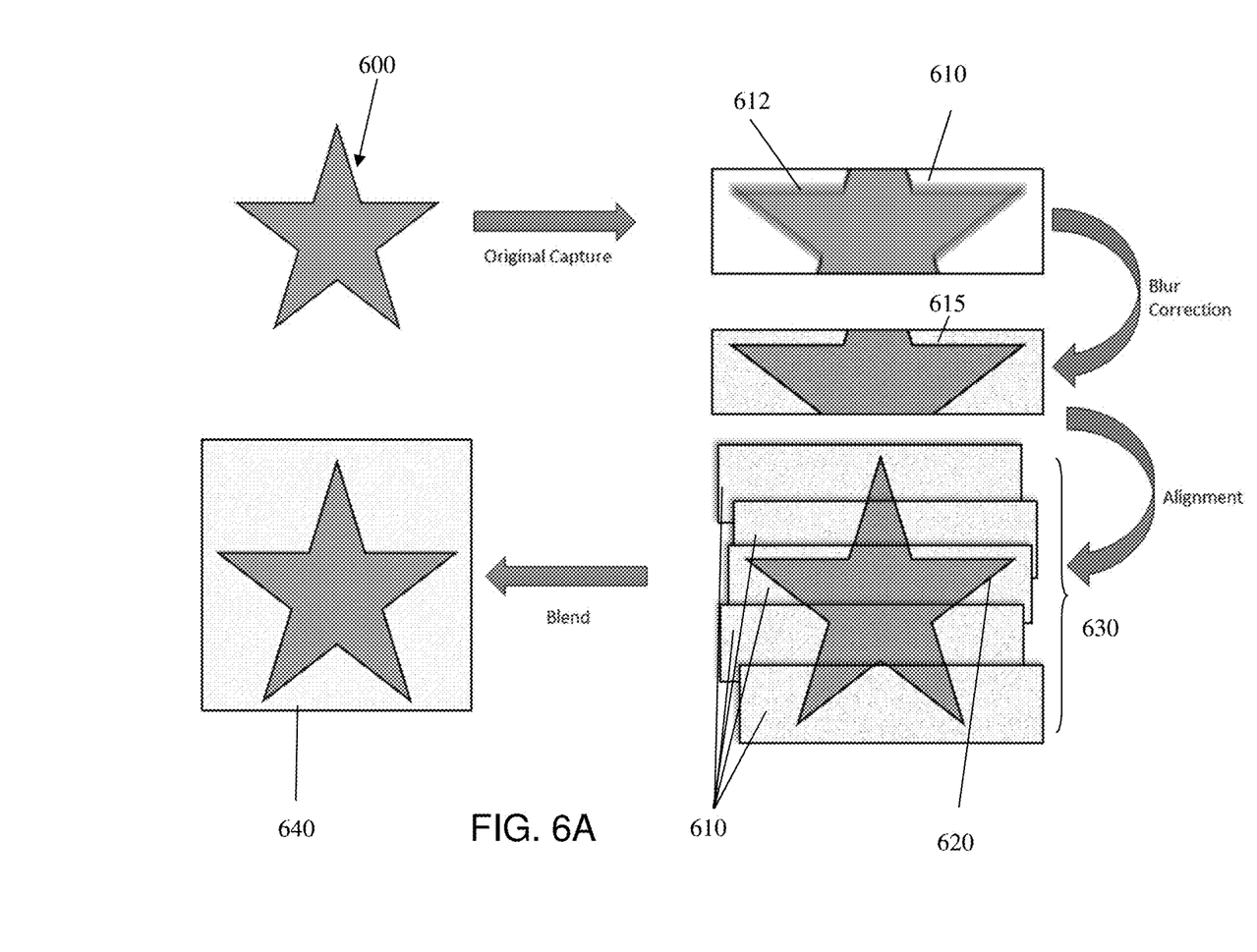
FIGS. 6A and 6B show a technique for correcting for motion blur in accordance with aspects of the invention.
Figure 6B:
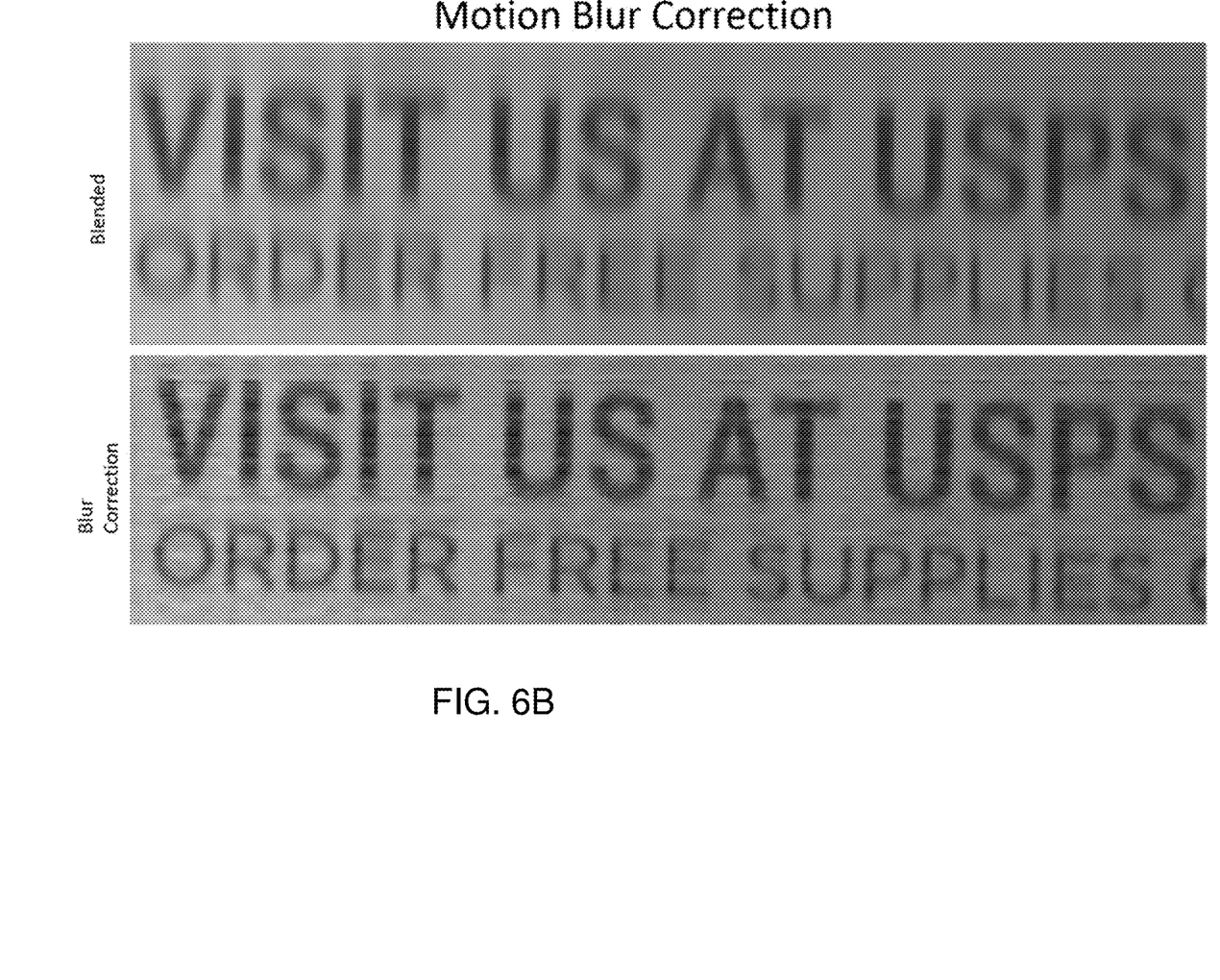

More specifically, FIGS. 6A and 6B representatively show a technique for correcting for motion blur. In this technique, once again, multiple lines for each slice of the object 600, e.g. stars, are simultaneously captured by a "slice scan" camera, as the object moves past the camera. And, as previously described, the "slice scan" camera will capture multiple slices of the object, which have overlapping subject matter such as, e.g., a point on the star 620.

In embodiments, the image is shown to be blurred at reference numeral 612. This may be caused by, e.g., decreased illumination or higher transport speeds. As shown at reference numeral 615, each of the blurred portions of the slices will be corrected, e.g., to bring it back into focus, by using the Wiener deconvolution technique as an example. The separate slices are then stitched together to form a single mosaic image representing the object as shown at reference numeral 630. In this implementation, each slice is now in focus and is aligned with the successive image as already described herein, e.g., by detecting and matching features (image registration) or intensity-based methods in the image which are common between successive slices, e.g., the point of the star 620. These frames (slices) are then blended together to form a seamless image as shown at reference numeral 640.

It should be noted that the processes shown in FIG. 4 may be used to compensate for any noise amplification.

Glare Reduction

As an object moves past a camera, any glare generally does not stay in the same place. That is, if one region of the object is obstructed by glare in a given frame, the same region may not be obstructed in the next frame. By implementing the techniques and processes described herein, during the blending process, regions which contain glare can be detected and ignored. This will result in a blended final image which contains significantly less glare as shown in FIGS. 7A and 7B.

By way of more specific example, as the slices 710 of an object 700, e.g. star, are captured by the "slice scan" camera, the brightness of a particular portion of the image may signify a glare 720, when compared to the same portion of the image on a different slice captured at a different time and hence different angle from the previous slice. It is possible to make such a determination by determining the pixel intensity of the image or portions of the image on each slice captured by the "slice scan" camera. For example, a glare can be assumed when there is a higher pixel intensity value for a portion of the image on the first slice compared to pixel intensity value for the same portion of the image on the second slice (or vice versa), captured at a different time and angle. In this example, to reduce any glare, the processes described herein can (i) ignore the overlapping image with the higher pixel intensity value, e.g., use the minimum value, (ii) average the two values together, or (iii) subtract the lower pixel intensity value from higher pixel intensity value as representatively shown at reference numeral 772. In embodiments, though, these techniques should not result in a value below a certain minimum threshold value (e.g., a pixel intensity value that would result in a dark image). The blended image 774 (from the stitched images 730) can then have a reduced or no glare.

Illustrative Sorting and Sequencing System

Figure 8:
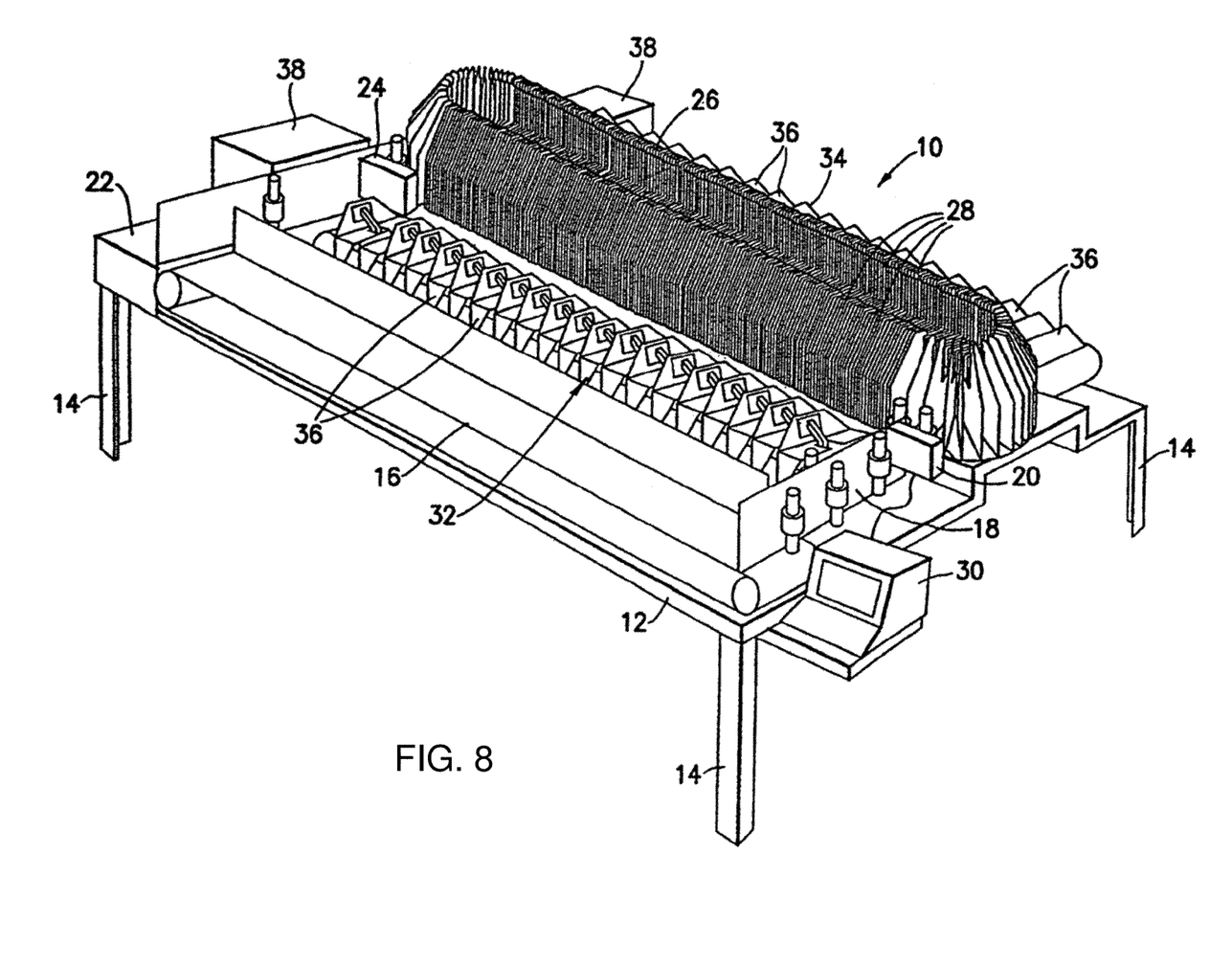
FIG. 8 shows an illustrative mail sorting and sequencing system, which can be used in implementing the processes of the present invention.

FIG. 8 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 8 should not be considered a limiting feature to the claimed invention.

As shown in FIG. 8, the mail sorting and sequencing system is a single pass carrier delivery sequence sorter generally indicated by the numeral 10. The single pass carrier delivery sequence sorter 10 has a base 12 with four legs 14 (only three shown in FIG. 8) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising:

capturing multiple lines of an image in a single slice as an object is moving past a camera;

capturing multiple slices which have common overlapping features of the image;

stitching together the multiple slices by aligning the common overlapping features of the image of a previous slice with the image of a successive slice to correct for motion of the object, between the multiple slices, as it moves past the camera and to form a single mosaic image of an object; and blending together the stitched together multiple slices, wherein the slices are shingled together to form the single mosaic image of the object, prior to the blending, the shingling together of the multiple slices comprises aligning successive images of each slice in order correct for any rocking motion of the object in between slices, and the alignment is a shift or offset of each slice with respect to a previous slice.

2. The method of claim 1, wherein the multiple lines are "N" number of lines which are equal to or approximately equal to a thickness of a focused illumination on a certain area of an object.

3. The method of claim 1, wherein the image is of two objects, one of which is blurry and one of which is in focus.

4. The method of claim 3, wherein the blurry object and the focused object are uniformly blurred and then deconvoluted to bring a large range of the images back into focus.

5. The method of claim 1, wherein at least 11 lines of data are captured at a time in a single slice and as low as 3×3.

6. The method of claim 1, wherein image registration or intensity-based methods in the image which are common between successive slices, are averaged together to reduce any noise from any single slice.

7. The method of claim 1, wherein a pixel intensity of the image or portions of the image on each captured slice is measured for overlapped images, and the pixel intensity is added together (and, optionally, normalized) for common features of the overlapped images to increase the pixel intensity.

8. The method of claim 7, wherein the added pixel intensity will not exceed a threshold value.

9. The method of claim 1, further comprising using a Wiener deconvolution technique to focus a blurred image on the slice or slices.

10. The method of claim 1, wherein a pixel intensity of overlapped images on each captured slice is measured, and a highest pixel intensity for an overlapping image is ignored to reduce glare.

11. The method of claim 1, wherein a pixel intensity of overlapped images on each captured slice is measured, and a lower pixel intensity is subtracted from a highest pixel intensity for an overlapping image is used to reduce glare.

12. The method of claim 1, wherein a pixel intensity of overlapped images on each captured slice is measured, and a minimum pixel intensity is used to reduce glare.

13. A computer program product comprising program code embodied in a computer-readable storage medium, the program code is readable/executable by a computing device to perform the method steps of claim 1.

14. A system comprising:
a CPU, a computer readable memory and a computer readable storage medium; and
program instructions to perform the method steps of claim 1;
wherein the program instructions are stored on the computer readable storage medium.

15. A method implemented in a computing device, comprising:
capturing multiple lines of an image in a single slice as an object is moving past a camera;
capturing multiple slices which have common overlapping features of the image;
stitching together the multiple slices by aligning the common overlapping features of the image of a previous slice with the image of a successive slice to correct for motion of the object, between the multiple slices, as it moves past the camera and to form a single mosaic image of an object; and
blending together the stitched together multiple slices, wherein:
the camera is a slice scan camera which simultaneously captures multiple lines of the object in a single slice and captures the multiple slices having the common overlapping features;
the stitching together the multiple slices includes an edge to edge process comprising aligning together the multiple slices at their edges by detecting transitioning features including different shades or colors of the image at the edges of each slice that are to be aligned together between different slices of the multiple slices; and further comprising:
increasing a depth of field of the image which includes:
a blurry image and a focused image are blurred uniformly and each of the slices are deconvoluted to bring a large range of the images back into focus using a wavefront coding technique,
after bringing the image back into focus, the multiple slices are then stitched together to form the single mosaic image; and
reducing noise in the image to correct for the motion, which includes:
prior to or after the stitching together, values of matched features in the image which are common between successive slices are averaged together to reduce any noise from any single slice.

16. The method of claim 15, wherein the slices are shingled together to form the single mosaic image of the object, prior to the blending.

17. The method of claim 16, wherein the shingling together of the multiple slices comprises aligning successive images of each slice in order correct for any rocking motion of the object in between slices.

18. The method of claim 17, wherein the alignment is a shift or offset of each slice with respect to a previous slice.

19. The method of claim 18, wherein stitching is provided by stitching together the slices at their edges by detect transitioning features that can be aligned together.

* * * * *